US010014796B2

(12) United States Patent
Meng et al.

(10) Patent No.: US 10,014,796 B2
(45) Date of Patent: Jul. 3, 2018

(54) POWER TRANSFORMER

(71) Applicant: NOBLE CORPORATION, Zhongshan, Guangdong Province (CN)

(72) Inventors: You Wei Meng, Zongshan (CN); Bo Gao, Zongshan (CN)

(73) Assignee: Gardenia Industrial Limited, Road Town (VG)

( * ) Notice: Subject to any disclaimer, the term of this patent is extended or adjusted under 35 U.S.C. 154(b) by 0 days.

(21) Appl. No.: 15/177,241

(22) Filed: Jun. 8, 2016

(65) Prior Publication Data

US 2017/0279369 A1  Sep. 28, 2017

(30) Foreign Application Priority Data

Mar. 25, 2016 (CN) .......................... 2016 1 0176924
Mar. 25, 2016 (CN) ...................... 2016 2 0237971 U

(51) Int. Cl.
| | |
|---|---|
| H02M 3/335 | (2006.01) |
| H02M 3/325 | (2006.01) |
| H02M 7/06 | (2006.01) |
| H02M 7/155 | (2006.01) |
| H02M 7/162 | (2006.01) |
| H02M 5/12 | (2006.01) |
| H02M 1/00 | (2006.01) |

(52) U.S. Cl.
CPC .............. *H02M 7/06* (2013.01); *H02M 5/12* (2013.01); *H02M 2001/0048* (2013.01)

(58) Field of Classification Search
CPC . H02M 2001/0006; H02M 2001/0048; H02M 5/10; H02M 5/12; H02M 5/293; H02M 7/06; H02M 7/66; H02J 9/005; H02J 2009/007

See application file for complete search history.

(56) References Cited

U.S. PATENT DOCUMENTS

| | | | |
|---|---|---|---|
| 5,565,714 A * | 10/1996 | Cunningham | .......... H02J 9/005 307/112 |
| 2007/0047270 A1* | 3/2007 | Makino | ................... H02J 9/005 363/34 |
| 2007/0115695 A1* | 5/2007 | Lou | ..................... H02M 3/1582 363/16 |

(Continued)

Primary Examiner — Timothy J Dole
Assistant Examiner — Sisay G Tiku
(74) Attorney, Agent, or Firm — Lewis Roca Rothgerber Christie LLP

(57) ABSTRACT

A transformer system includes: a main transformer including a primary winding coupled to AC mains and a secondary winding; a load circuit including a load switch configured to be coupled to a load, the load circuit being coupled to the secondary winding of the main transformer; an auxiliary power supply coupled to AC mains; a controller coupled to an output of the auxiliary power supply; an electronic switch between the AC mains and the primary winding of the main transformer and configured to be controlled by the controller; and a load detector coupled to the load circuit and configured to detect whether the load is connected to the main transformer and to output a load signal to the controller in accordance with whether or not the load is connected to the main transformer, wherein the controller is configured to control the electronic switch in accordance with the load signal.

7 Claims, 2 Drawing Sheets

(56) References Cited

U.S. PATENT DOCUMENTS

| | | | |
|---|---|---|---|
| 2008/0290808 A1* | 11/2008 | Danjo | H05B 41/2883 315/206 |
| 2009/0154206 A1* | 6/2009 | Fouquet | H02J 9/005 363/84 |
| 2011/0096573 A1* | 4/2011 | Zhu | H02M 3/33523 363/21.17 |
| 2012/0139477 A1* | 6/2012 | Oglesbee | H02J 7/00 320/107 |
| 2014/0091754 A1* | 4/2014 | Shum | H02J 7/0057 320/107 |
| 2015/0194875 A1* | 7/2015 | Jutras | H02M 1/36 363/49 |
| 2015/0280573 A1* | 10/2015 | Gong | H02M 3/33523 363/21.14 |
| 2015/0280578 A1* | 10/2015 | Huang | H02M 1/32 363/21.12 |
| 2015/0280584 A1* | 10/2015 | Gong | H02M 3/33515 363/21.13 |

* cited by examiner

POWER TRANSFORMER

CROSS-REFERENCE TO RELATED APPLICATION(S)

This application claims priority to and the benefit of Chinese Patent Application No. 201610176924.6 and Chinese Utility Model Application No. 201620237971.2, both filed in the State Intellectual Property Office of the People's Republic of China on Mar. 25, 2016, the entire disclosures of which are incorporated herein by reference.

FIELD

Aspects of embodiments of the present invention relate to power electronics technology, in particular, a transformer having low loss at no-load (or low no-load loss).

BACKGROUND

In traditional transformer design, increasing power generally results in increasing load loss—for example, no-load loss of a common transformer with power of 300 W often reaches 9.5 W—can be applied in developing countries. However, in certain developed countries, such as the United States, may impose energy efficiency index requirements, such as the United States Department of Energy (DOE) transformer no-load power consumption requirements of less than 0.2 W~0.3 W. Therefore, there is a motivation to reduce transformer no-load loss.

Because transformer no-load loss is mainly due to reactive power of the composition of the transformer core (e.g., an iron core), no-load loss can be reduced by reducing the reactive power, therefore, aspects of embodiments of the present invention relate to improved core performance, as well as increasing the number of turns, and, in this way, addresses high costs and the large volume of the conventional or comparative transformer designs.

SUMMARY

Aspects of embodiments of the present invention are directed to a transformer having a low no-load losses, thereby meeting energy efficiency standards for transformer losses while also having low-cost.

According to one embodiment of the present invention, a low no-load loss transformer system includes: a main transformer including a primary winding coupled to AC mains and a secondary winding; a load circuit including a load switch configured to be coupled to a load, the load circuit being coupled to the secondary winding of the main transformer; an auxiliary power supply coupled to AC mains; a controller coupled to an output of the auxiliary power supply; an electronic switch coupled between the AC mains and the primary winding of the main transformer and configured to be controlled by the controller; and a load detector coupled to the load circuit and configured to detect whether the load is connected to the main transformer and to output a load signal to the controller in accordance with whether or not the load is connected to the main transformer, wherein the controller is configured to supply an output scanning pulse signal to the electronic switch via a control terminal and to control the electronic switch in accordance with the load signal.

The electronic switch may include a relay and a transistor, the relay being coupled in series between the primary winding of the main transformer T1 and the AC mains, the relay having control terminals connected to a first terminal of the transistor and the output of the auxiliary power supply the transistor having a second terminal connected to ground and a third terminal connected to the control terminal of the controller.

The load detector may include at least one of a voltage transformer, a current transformer, a photoelectric sensor, and a linkage detection switch coupled to the load switch.

The auxiliary power supply may include: an auxiliary transformer having a primary winding coupled to the AC mains and a secondary winding; a rectifier circuit coupled to the secondary winding of the auxiliary transformer; and a filter circuit coupled between the rectifier circuit and the controller.

The low no-load loss transformer system may further include: a series voltage divider circuit coupled between the auxiliary power supply and the controller, the series voltage divider circuit being configured to detect an input voltage of the auxiliary power supply and to supply, to the controller, an input signal corresponding to the input voltage.

The auxiliary power supply may be a switching power supply.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
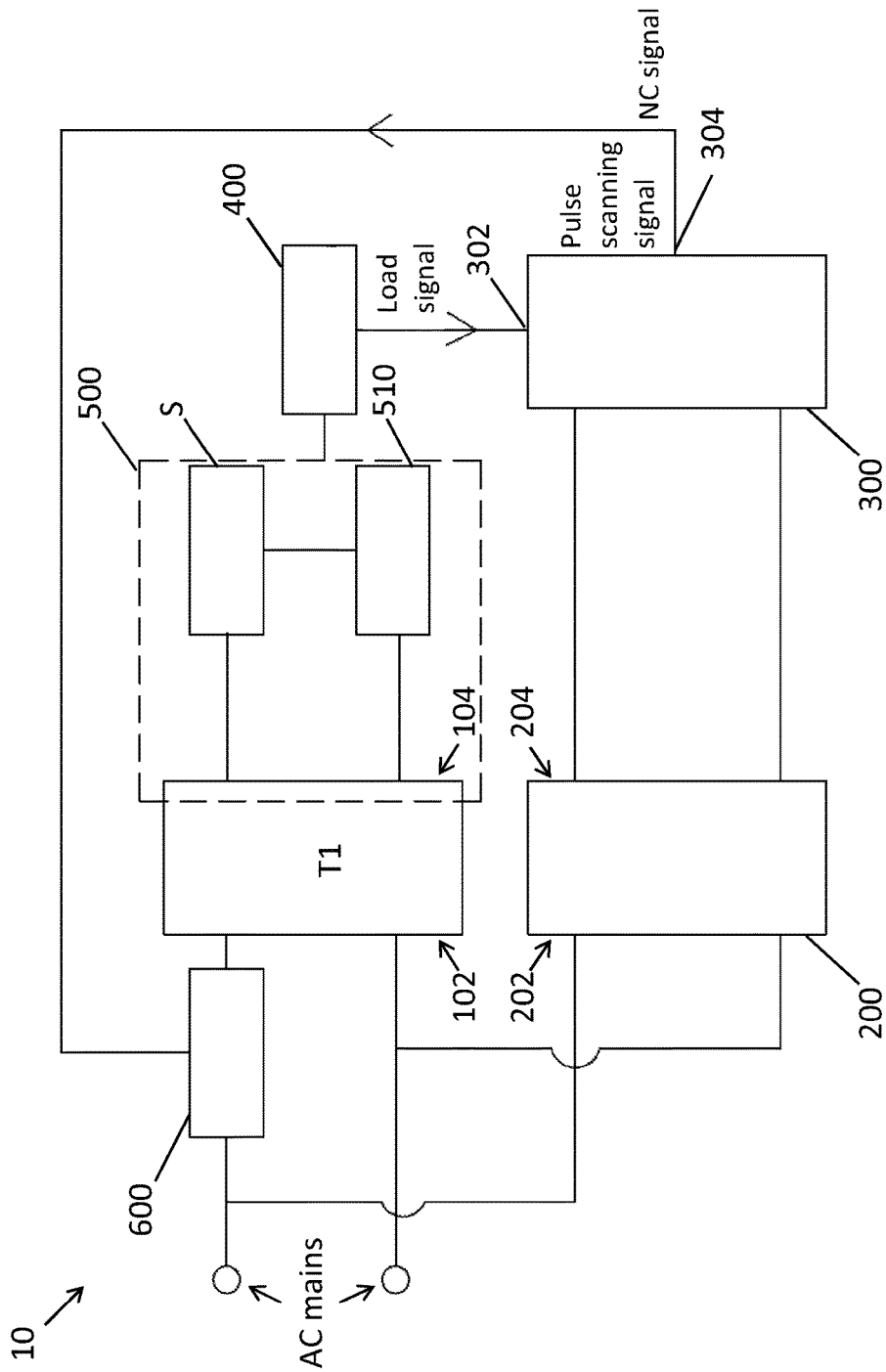
FIG. 1 is a block diagram of a transformer system according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present invention relate to a transformer device or transformer system 10 including a main transformer T1 and a low no-load loss auxiliary power supply 200, combined with a controller 300 (e.g., a microcontroller or a single chip module (SCM) or an application specific integrated circuit (ASIC)), electronic switches, load detector 400, and the like. The controller 300 is powered using only the low-power auxiliary power supply 200 and is configured to disconnect the main transformer T1 at no-load condition. In particular, the main transformer T1 load output pulse scanning signal is used to control the electronic switch 600, and the real-time load detector 400 is configured to detect whether the load circuit 500 is turned on, in other words, to detect when the load switch S is closed and the load 510 is connected to the main transformer T1. As such, a transformer capable of high efficiency during normal use can also achieve reduced no load loss, and can thereby meet the US DOE energy efficiency standard indicators. In addition, the circuit also allows for a simple voltage divider circuit to provide undervoltage/overvoltage/overload/short circuit protection.

As shown in FIG. 1, a low no-load loss transformer system according to one embodiment of the present invention includes a main transformer T1, an auxiliary power supply 200, a controller (SCM) 300, an electronic switch 600, and a load detector 400. The main transformer may include a primary winding T1-1 (see FIG. 2A) coupled to the AC mains via the electronic switch 600 and a secondary winding T1-2 (see FIG. 2A) coupled to the load circuit 500.

The connections between these components include: the input end (or electric power supply end) 102 of the main transformer T1 and input end of 202 of the auxiliary power supply 200 connected to AC mains, the secondary winding 104 of the main transformer T1, in series with load switch S, and load 510 forming the load circuit 500, the load detector 400 configured to detect whether the load circuit 500 is turned on and connected to the controller 300 and configured to provide a feedback signal (or "load signal") to the main transformer T1, an output end 204 of the auxiliary power supply 200 is connected to the input end of the controller 300, and an electronic switch 600 is coupled in series between the input end 102 of the main transformer T1 and input AC mains, where the electronic switch 600 is coupled to and controlled by the control terminal 304 of the controller 300.

According to one embodiment of the present invention, the transformer system 10 operates as follows. When idling (e.g., when no power is to be supplied to load 510, such as when the device is turned off), the electronic switch 600 is turned off and therefore the primary winding of the main transformer T1 receives no input power, but using only low-power auxiliary power supplied via the auxiliary power supply 200, the controller 300 generates load output pulse scanning signals that are periodically output via the control terminal 304 to control electronic switch 600 to turn on transiently (e.g., momentarily), and the load real-time detector 400 is configured to detect whether the load circuit 500 is turned on once the load switch S is closed, based on the transient closing of electronic switch 600 to supply power through the main transformer T1 to the load circuit 500. When the controller 300 detects that the load circuit 500 is turned on, the electronic switch 600 is maintained closed, and the main transformer T1 supplies power under normal running conditions with high efficiency, thereby achieving load losses of less than 0.2 W, which meets or exceeds the US DOE energy efficiency standard indicators.

Figures 2A, 2B:
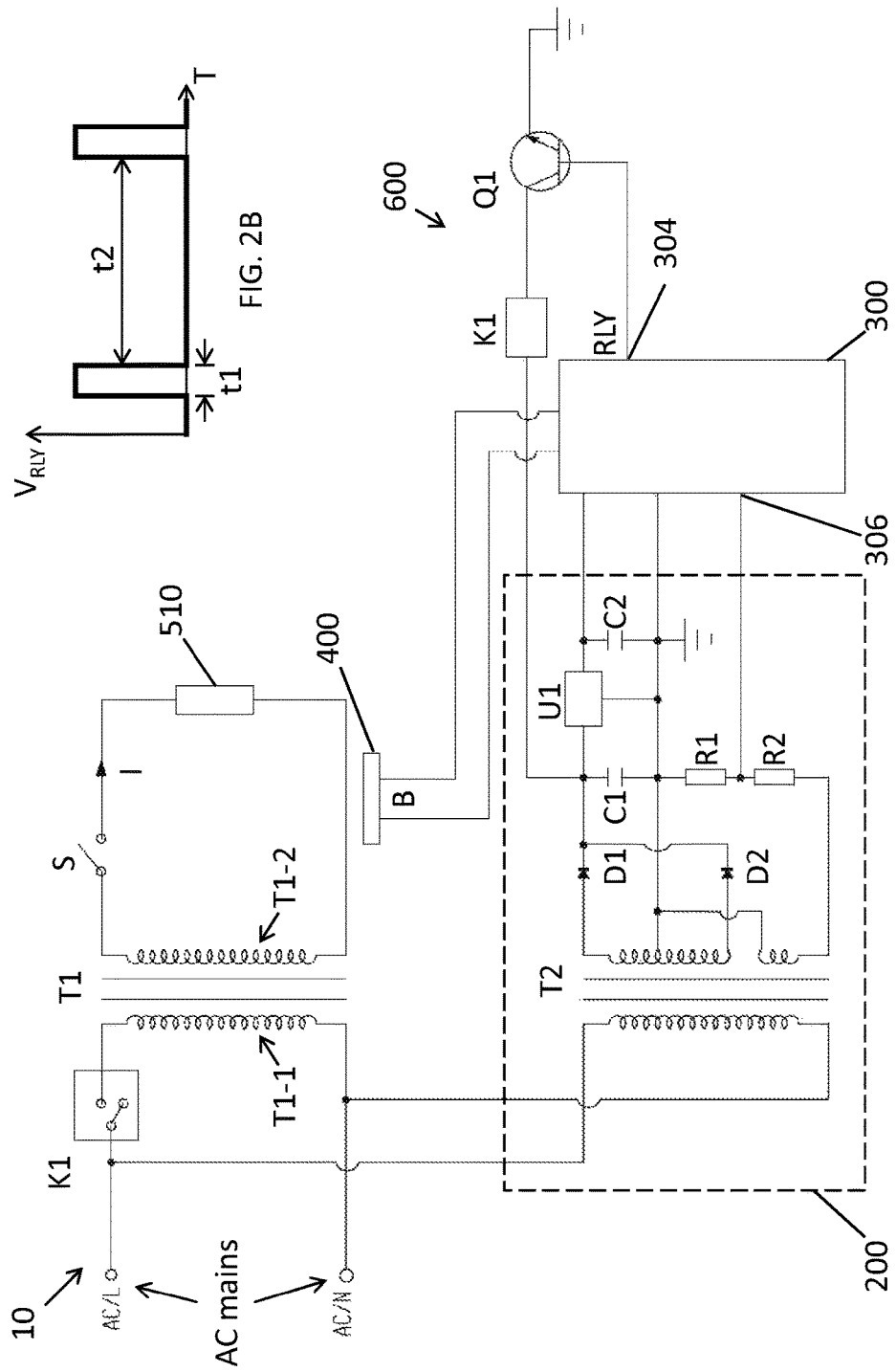
FIG. 2A is a circuit diagram of a transformer system according to one embodiment of the present invention.
FIG. 2B is a waveform diagram illustrating an output pulse of a controller in accordance with one embodiment of the present invention.

FIG. 2A is a circuit diagram illustrating one embodiment of the present invention including an electronic switch 600 that includes the relay K1 and the transistor Q1, where relay K1 normally has open contacts and is connected in series between the input end 102 of the main transformer T1 and the end of the AC mains supply side, two coil ends of relay K1 includes control terminals that are respectively connected to a first terminal (e.g., the collector) of the transistor Q1 and the output end 204 of the auxiliary power supply 200. A second terminal (e.g., the emitter) of the transistor Q1 is grounded and a third terminal (e.g., the base) of the transistor Q1 is connected to the pulse scanning signal output from control terminal 304 of the controller 300 (labeled RLY in FIG. 2A). It should be noted that embodiments of the present invention are not limited thereto and, in other embodiments of the present invention, the electronic switch 600 may be implemented with other switching devices such as thyristors, or by using power switching devices such as a field effect transistor (FET), an insulated-gate bipolar transistor (IGBT), or other known alternatives.

In the embodiment shown in FIG. 2A, the load detector 400 includes voltage transformer B, however, embodiments of the present invention are not limited thereto and, in some embodiments of the present invention, the load detector 400 can also include current transformers, photoelectric sensors, and a linkage detection switch for detecting that load switch S is closed and other load detection unit based on linkage, and, in still other embodiments, may use different detection means based on the type of load 510, such as photoelectric sensors in the case of a lamp load, or microphones for audio speaker loads, in other words, in some embodiments, the load detection unit may vary based on the type of the load.

FIG. 2A illustrates one embodiment of a low no-load loss auxiliary power supply 200, which includes an auxiliary transformer T2, a rectifier circuit, and a filter circuit in turn connected to the secondary winding of the auxiliary transformer T2, where the output terminal of the filter circuit is connected to the controller 300, wherein the rectifier circuit includes diodes D1 and D2 arranged as a half-bridge rectifier, wherein the filter circuit includes capacitors C1, C2 and three-terminal regulator U1. In addition, the auxiliary power supply 200 according to embodiments of the present invention can also be a low no-load loss switching power supply, or other known low no-load power supplies.

According to one embodiment of the present invention, the embodiment shown in FIG. 2A may be operated as follows:

1) When the input power is supplied to the AC mains AC/L and AC/N, relay K1 is in a disconnected or open state and, therefore, power is not supplied to the main transformer T1, while power is supplied to the auxiliary transformer T2. As such, the system no-load loss P0 is equal to the no-load loss of auxiliary transformer T2 no-load loss P02, in other words, P0=P02. Because the no-load loss of auxiliary transformer T2 is relatively small, it is easy maintain P02 less than 0.2 W.

2) When T2 is powered, the control terminal 304 (RLY) of the controller 300 outputs a pulse scanning signal directly to the base (or gate) of transistor Q1 to control relay K1, as shown in FIG. 2B. When the pulse signal is supplied for time period t1, the main transformer T1 turns on, then the total load loss P0=P01+P02; when the pulse signal is not supplied (e.g., turned off) during time period t2, the main transformer T1 is turned off and the load loss P0=P02. In embodiments of the present invention, t2 is far greater t1 (e.g., t2>>t1), so that it can be considered throughout the period T (where T=t1+t2), the total input load loss P≈P02.

3) While the load 510 is disconnected by load switch S, the controller 300 periodically scans by supplying the pulse signal to the electronic switch 600, while consuming low power, thereby achieving low no-load loss 4) When the load switch S is turned on, when the scanning waveform is supplied during a time period t1, the main transformer T1 secondary winding current I passes through a voltage transformer B to generate a load signal to the controller 300, and, in response, the controller 300 outputs a signal via the control terminal 304 maintain relay K1 in a turned on state, so that the main transformer T1 is maintained in an operating condition. Because the design of the main transformer T1 does not need to take into account the load loss, it is possible for the main transformer T1 to meet the specified efficiency requirements.

5) When the load 510 is disconnected by load switch S, the main transformer T1 secondary current decreases to zero (I=0), and the load signal from the load detector 400 (e.g., voltage transformer B) changes to reflect the no-load state of the load circuit 500. The change in the load signal is detected by the controller 300, which controls the electronic switch 600 (e.g., relay K1) open, and for the controller 300 to return to a state in which it periodically applies scanning pulses via the control terminal 304 to detect the presence of a load.

The embodiment of the invention shown in FIG. 2A also includes a series voltage divider circuit between the auxiliary power supply 200 and the controller 300, where the series voltage divider circuit may be configured to generate an input signal corresponding to the input voltage of the auxiliary power supply 200, the input signal indicating an input voltage that is too low or too high, the input signal being supplied to an auxiliary input terminal 306 of the controller 300. The voltage divider circuit may include resistors R1 and R2 connected in series, and may thereby provide easy to implement undervoltage/overvoltage/overload/short circuit protection.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A low no-load loss transformer system comprising:
    a main transformer comprising a primary winding coupled to AC mains and a secondary winding;
    a load circuit comprising a load switch configured to be coupled to a load, the load circuit being coupled to the secondary winding of the main transformer;
    an auxiliary power supply coupled to the AC mains;
    a controller coupled to an output of the auxiliary power supply;
    an electronic switch coupled between the AC mains and the primary winding of the main transformer and configured to be controlled by the controller; and
    a load detector coupled to the load circuit and configured to detect whether the load is connected to the main transformer and to output a load signal to the controller in accordance with whether or not the load is connected to the main transformer,
    wherein the controller is configured to supply an output scanning pulse signal to the electronic switch via a control terminal to control the electronic switch to electrically connect the AC mains to the main transformer during the output scanning pulse signal and to control the electronic switch in accordance with the load signal; and
    wherein the load detector is further configured to:
        detect whether the load is connected to the main transformer only while the electronic switch is closed in response to the output scanning signal supplied by the controller and
        not be able to detect whether the load is connected to the main transformer while the electronic switch is open.

2. The low no-load loss transformer system of claim 1, wherein: the electronic switch comprises a relay and a transistor, the relay being coupled in series between the primary winding of the main transformer T1 and the AC mains, the relay having control terminals connected to a first terminal of the transistor and the output of the auxiliary power supply, the transistor having a second terminal connected to ground and a third terminal connected to the control terminal of the controller.

3. The low no-load loss transformer system of claim 1, wherein: the load detector comprises at least one of a voltage transformer, a current transformer, a photoelectric sensor, and a linkage detection switch coupled to the load switch.

4. The low no-load loss transformer system of claim 1, wherein the auxiliary power supply comprises:
    an auxiliary transformer having a primary winding coupled to the AC mains and a secondary winding;
    a rectifier circuit coupled to the secondary winding of the auxiliary transformer; and
    a filter circuit coupled between the rectifier circuit and the controller.

5. The low no-load loss transformer system of claim 4, further comprising:
    a series voltage divider circuit coupled between the auxiliary power supply and the controller, the series voltage divider circuit being configured to detect an input voltage of the auxiliary power supply and to supply, to the controller, an input signal corresponding to the input voltage.

6. The low no-load loss transformer system of claim 1, wherein the auxiliary power supply is a switching power supply.

7. The low no-load loss transformer system of claim 6, further comprising:
    a series voltage divider circuit coupled between the auxiliary power supply and the controller, the series voltage divider circuit being configured to detect an input voltage of the auxiliary power supply and to supply, to the controller, an input signal corresponding to the input voltage.

* * * * *